Dec. 28, 1943.　　　W. A. BEHR　　　2,338,073
ADJUSTABLE SPOT-FACER AND BORING TOOL
Filed Aug. 19, 1940
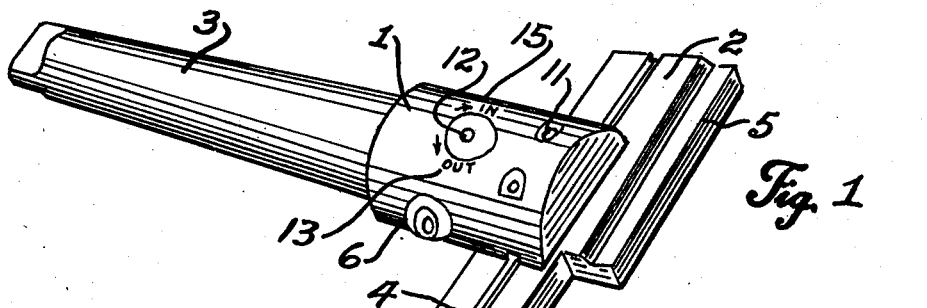
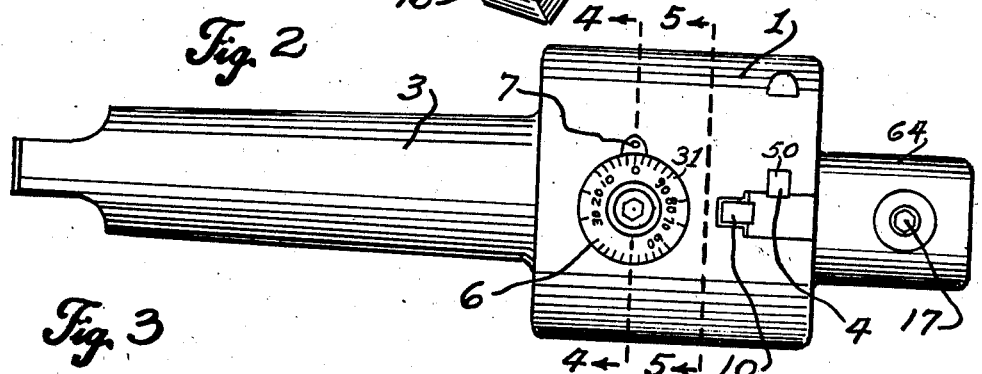
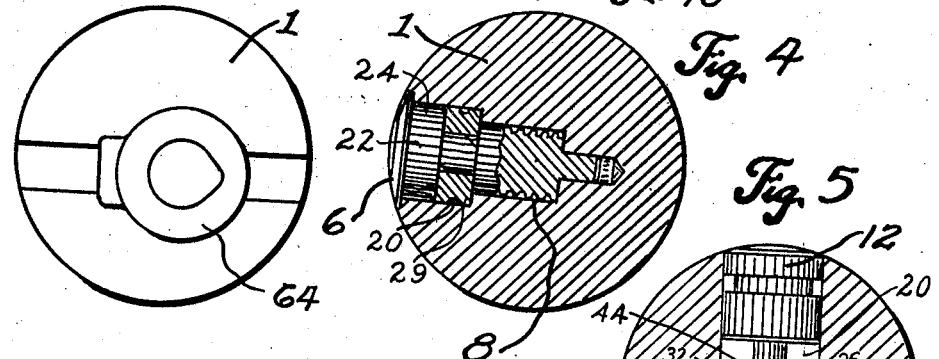
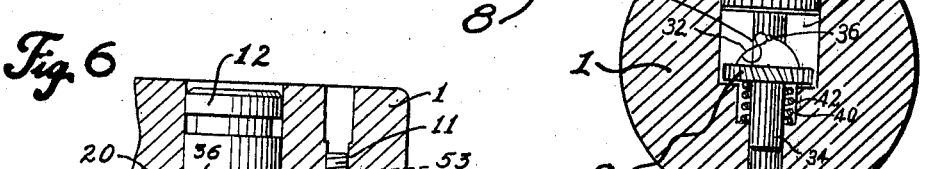
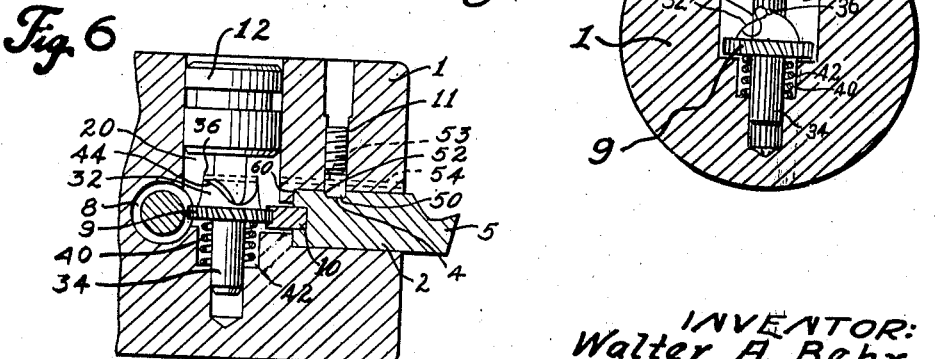
INVENTOR:
Walter A. Behr,
By Grover Cuthill,
ATTORNEY.

Patented Dec. 28, 1943

2,338,073

UNITED STATES PATENT OFFICE 2,338,073

ADJUSTABLE SPOT-FACER AND BORING TOOL

Walter A. Behr, Detroit, Mich.

Application August 19, 1940, Serial No. 353,182

4 Claims. (Cl. 77—58)

The present invention relates to improvements in tools adapted for spot-facing or counterboring, and provides a device of this character that has a very simplified construction, simple in operation, and decidedly efficient in the desired results, and being extraordinarily sturdy.

In the operation of boring tools used in the metal and wood working industries difficulty has been experienced in counterboring or spot-facing holes to provide a flat surface at the bottom of the hole perpendicular to the side walls forming the hole. Various tools have heretofore been developed in an effort to overcome the difficulties involved. These tools have not been satisfactory because they have longitudinally extending shanks or body sections and carry radially extending cutting blades. These tools cannot efficiently face the metal forming the bottom of holes.

An object of this invention is to provide a tool having an axially extending cutting member whereby the bottom of drilled holes can be readily finished to provide a substantially flat bottom wall perpendicular to the side walls forming the hole.

A further object of the invention resides in the provision of a cutting tool having an axially extending adjustable blade.

Another object is to provide a spot-facing tool having manually operable means to readily engage or release various cutting blades or adapter heads.

One of the advantages of the invention is the provision of a tool having a micrometer adjustment. It is readily susceptible to engaging or disengaging intricate mechanism, thereby enabling the operator thereof to remove or insert various blades or cutters.

The invention possesses features of perfect alignment relative to the squareness with axis of the machine, or the work to be fabricated.

It is also well adapted to any or all wood or metal working machines.

It possesses certain features of a blade or cutter constructed in a manner which is directly suitable for any type of material or work.

With the foregoing in mind, it will become readily apparent that the invention possesses further advantages, all of which will be clearly revealed during the course of the following detailed description, illustrated throughout the accompanying drawing, and more fully pointed out in the appended claims.

With reference to the drawing:

Fig. 1 is a perspective view of the tool with a cutter blade in place therein.

Fig. 2 is an elevational view of the tool with an adapter head substituted for the cutter blade illustrated in Fig. 1.

Fig. 3 is a front elevation of the device illustrated in Fig. 2.

Fig. 4 is a sectional view taken substantially on the line 4—4 of Fig. 2 looking in the direction of the arrows.

Fig. 5 is a sectional view taken substantially on the line 5—5 of Fig. 2 looking in the direction of the arrows.

Fig. 6 is a fragmentary longitudinal sectional view of the device illustrated in Fig. 1.

Referring now to Fig. 1, it will be observed that a boring tool having a body section 1 is provided with a shank 3 whereby the tool may be removably secured to a member in such a manner as to be movable relative to a piece of work. A cutting blade 2 having a cutting edge 5 may be removably secured by cooperating guide and slot members 4 preferably in the end of the body section 1 of the tool.

Means may be provided whereby the cutting blade 2 may be adjustably secured relative to the body portion 1 in such a manner that it may be projected radially to adapt the tool for counterboring or spot-facing holes of varying diameters.

One desirable form of such control or adjusting means comprises cooperating gears interposed between the blade 2 and the body section 1. The blade 2 may be provided with a rack or gear 10 welded or otherwise suitably secured thereto. The body section 1 is provided with a radially extending aperture 20 adapted to receive a rotatable member 22. The rotatable member 22 is suitably journaled in an aperture 24 and carries a worm gear 8. A split bearing member 29 may be provided to assist in guiding the rotatable member 22.

The rotatable member 22 may be provided with a graduated dial 6 having indications 31 thereon cooperating with a zero mark 7 carried by the body section 1 to indicate the extent of rotational movement of the worm gear 8. The radial position of the blade 2 can therefore be accurately controlled, and a ready indication given of the radial spacing of the cutting edge 5 of the blade 2 to indicate the diameter of the hole which the cutter will face.

Interposed between the worm gear 8 and the rack 10 carried by the blade 2 is an idler gear 9 having an axially extending cam member 32, The idler gear 9 is rotatably mounted on a shaft 34 having a pin 36 extending therethrough. The idler gear 9 is yieldingly urged axially of the shaft 34 by means of a spring 40 positioned in a bore 42 to maintain slots 44 of the cam members 32 in engagement with the pin 36.

When it is desired to remove the blade 2 from the body section 1, the locking screw 11 is released and the member 12 is rotated in the counterclockwise direction as indicated by the lower arrow in Fig. 1. The spring pressed pin 36 then disengages the slots 44 of the cam members 32 and permits the spring 40 to urge the idler gear 9 axially on the shaft 34 to move the idler gear 9 out of engagement with the rack 10 of the blade 2 thereby disconnecting worm gear 8 from the rack 10.

The blade 2 is guided relative to the body section 1 by means of a spring pressure key 50 having a beveled surface 52 which engages within the slot 4 formed in the blade 2. The key 50 is preferably provided with an aperture 53 to receive a stud 54 extending longitudinally of the body section 1. Yielding means of any suitable form may be provided to yieldingly urge the key 50 into engagement with the material forming the slot 4 of the blade 2 and to maintain the edge of the blade in engagement with the surface 60 of the body member 1.

Means may be provided to adapt the tool for receiving blades 10 of smaller length to spot-face or counterbore smaller apertures than could be spot-faced with a single cutting blade. One desirable form of such means comprises an adapter head 64 having a contoured end portion corresponding with the end portion of the blade 2 having a toothed rack 10 thereon whereby the adapter head 64 may be detachably connected within the body member 1. Any suitable form of boring tool may be detachably connected in the adapter head 64 to spot-face or countersink holes of smaller diameter than the body member 1.

For boring smaller holes by using round shank tool now in use, special boring head 64 is provided and is inserted into body member 1 of the device similarly as blade 2. Set screw 17 is provided so as to hold in a removable boring tool.

This new and improved boring tool is provided with a special head for holding standard existing tools for boring small and large holes with the same body or holder without changing to any other form of equipment.

Having thus fully described my invention, what I claim as new is:

1. In a cutting tool having a shank, a radially movable axially extending cutting blade carried by the shank, a geared rack carried by the cutting blade, a worm gear carried by the shank, an idler gear interposed between the worm gear and rack, and manually operable means to move the idler gear to disconnect the rack from the worm gear to facilitate rapid manipulation of the cutting blade relative to the shank.

2. In a cutting tool, a shank having a transversely extending slot in one end, a cutter having a geared segment positioned in the slot, a worm gear rotatably mounted in the shank, a shaft journaled in the shank, an idler gear on the shaft and axially movable between a position interconnecting the worm gear and geared segment and a position disconnecting the worm gear from the geared segment, cooperating cam and pin means between the idler gear and shaft controlling the position of the idler gear, and yielding means urging the idler gear towards one of said positions.

3. A cutting tool comprising a shank having a transversely extending slot in one end, a cutter carrying member having a geared segment positioned in the slot, a worm gear rotatably mounted in the shank, a shaft journaled in the shank, an idler gear on the shaft and axially movable between a position interconnecting the worm gear and geared segment and a position disconnecting the worm gear from the geared segment, cooperating cam and pin means between the idler gear and shaft controlling the position of the idler gear, yielding means urging the idler gear towards one of said positions, manually operable means controlling the idler gear, and manually operable means for actuating the worm gear to control the position of the cutter carrying member relative to the shank.

4. In a cutting tool having a shank, a radially movable axially extending cutter carrying member in the shank, a geared rack carried by the cutter carrying member, a worm gear carried by the shank, an idler gear interposed between the worm gear and rack, and manually operable means to move the idler gear to disconnect the rack from the worm gear to facilitate rapid manipulation of a cutter carrying member relative to the shank.

WALTER A. BEHR.